US012798482B2

(12) United States Patent
Fischer et al.

(10) Patent No.: US 12,798,482 B2
(45) Date of Patent: Nov. 17, 2026

(54) CAMERA SYSTEM FOR THE ACCURATE COUPLING OF A TRAILER VEHICLE TO A TRACTOR VEHICLE

(71) Applicant: JOST-WERKE DEUTSCHLAND GMBH, Neu-Isenburg (DE)

(72) Inventors: Michael Fischer, Nagold (DE); Stephan Gitzen, Riedstadt (DE); Benjamin Kaufhold, Seeburg (DE); Mark Müller, Frankfurt (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 0 days.

(21) Appl. No.: 19/136,472

(22) PCT Filed: Dec. 7, 2023

(86) PCT No.: PCT/IB2023/062362

§ 371 (c)(1),
(2) Date: Jun. 6, 2025

(87) PCT Pub. No.: WO2024/121792

PCT Pub. Date: Jun. 13, 2024

(65) Prior Publication Data

US 2026/0042395 A1 Feb. 12, 2026

(30) Foreign Application Priority Data

Dec. 7, 2022 (DE) ......................... 102022004590.7

(51) Int. Cl.

| | |
|---|---|
| ***B60R 1/26*** | (2022.01) |
| ***B62D 21/02*** | (2006.01) |
| ***B62D 53/08*** | (2006.01) |
| ***H04N 7/18*** | (2006.01) |
| ***H04N 23/90*** | (2023.01) |
| *B60D 1/01* | (2006.01) |
| *B60D 1/36* | (2006.01) |
| *B60R 19/56* | (2006.01) |

(52) U.S. Cl.

CPC ................ *B60R 1/26* (2022.01); *B62D 21/02* (2013.01); *B62D 53/08* (2013.01); *H04N 7/181* (2013.01);

(Continued)

(58) Field of Classification Search

CPC ..... B60R 1/26; B60R 19/56; B60R 2300/105; B60R 2300/808; B62D 21/02;

(Continued)

(56) References Cited

U.S. PATENT DOCUMENTS 6,693,524 B1 * 2/2004 Payne ....................... B60R 1/26
348/E7.086
9,357,114 B1 * 5/2016 Whitehead ............. H04N 23/90

(Continued)

FOREIGN PATENT DOCUMENTS

AU 2015306153 B2 2/2016
CA 3063011 A1 5/2020

(Continued)

*Primary Examiner* — Gims S Philippe

(74) *Attorney, Agent, or Firm* — Hudak, Shunk & Farine Co. LPA

(57) ABSTRACT

A camera system for the accurate coupling of a trailer vehicle to a tractor vehicle, having a first camera that is attachable to the tractor vehicle and provides first image data, and a second camera that provides second image data and is attached in an offset manner on one of the vehicle axes (x, y, z) of the tractor vehicle with respect to the first camera, wherein the first and second image data are displayed as a common screen motif on a display device installed in the driver's cab. The first and second cameras are oriented such that a safety-relevant region (SD) behind the tractor vehicle is recorded by the first camera and a coupling-relevant region (SR), in which a coupling element, to be controlled, of the trailer vehicle is discernible, is recorded by the second camera.

15 Claims, 3 Drawing Sheets

(52) U.S. Cl.
CPC ............... *H04N 23/90* (2023.01); *B60D 1/01* (2013.01); *B60D 1/36* (2013.01); *B60R 19/56* (2013.01); *B60R 2300/105* (2013.01); *B60R 2300/808* (2013.01)

(58) Field of Classification Search
CPC ........ B62D 53/08; H04N 7/181; H04N 23/90; B60D 1/01; B60D 1/36
See application file for complete search history.

(56) References Cited

U.S. PATENT DOCUMENTS

| | | | | |
|---|---|---|---|---|
| 11,030,476 | B2 * | 6/2021 | Xu | H04N 7/188 |
| 2008/0044061 | A1 * | 2/2008 | Hongo | B60R 1/23<br>382/104 |
| 2013/0107045 | A1 * | 5/2013 | Soderlind | B60R 1/04<br>348/148 |
| 2021/0078504 | A1 * | 3/2021 | Skaradzinski | H04N 7/183 |

FOREIGN PATENT DOCUMENTS

| | | | |
|---|---|---|---|
| DE | 102014 218 995 | A1 | 3/2016 |
| DE | 10 2016 120 349 | A1 | 6/2017 |
| DE | 10 2016 111 618 | A1 | 12/2017 |
| DE | 10 2018 201 027 | A1 | 7/2019 |
| DE | 10 2019 008 918 | A1 | 6/2021 |
| DE | 10 2020 003 141 | A1 | 12/2021 |
| GB | 2513393 | A | 10/2014 |
| WO | 2019/231475 | A1 | 12/2019 |

* cited by examiner

CAMERA SYSTEM FOR THE ACCURATE COUPLING OF A TRAILER VEHICLE TO A TRACTOR VEHICLE

FIELD OF THE INVENTION

The invention relates to a camera system for precise coupling of a trailer vehicle to a tractor vehicle having a first camera that is attachable to the tractor vehicle and provides first image data, and a second camera that provides second image data and is attached in an offset manner on one of the vehicle axes (x, y, z) of the tractor vehicle with respect to the first camera, wherein the first and second image data are displayed as a common screen motif on a display device installed in the driver's cab. Furthermore, the invention is also implemented on a tractor vehicle.

BACKGROUND OF THE INVENTION

The tractor vehicle has a corresponding coupling means for releasably attaching a trailer-side coupling element. During the coupling process, the tractor vehicle typically approaches the stationary trailer in slow reverse, whose trailer-side coupling element must be inserted as precisely as possible into the tractor vehicle's coupling means and then locked therein. An imprecise approach of the tractor vehicle results in the trailer-side coupling element not being engaged by the tractor vehicle's coupling means, which can cause significant damage to the vehicles. Particularly dangerous is a supposedly correct coupling, in which the trailer-side coupling element is not fully locked into the tractor vehicle-side coupling means, which can lead to the vehicles becoming detached while driving.

There are already efforts in the state of the art to simplify the coupling process for the driver. US 2014/0151979 A1 proposes to mount a camera carrier between beams of the vehicle frame and to install a rearward-facing first camera on the camera carrier to capture the kingpin of a trailer vehicle and a forward-facing second camera to capture the entry opening of a fifth wheel coupling.

Both cameras are connected to a display device located in the driver's cab. The screen motif from both cameras can then be displayed side by side on the display device, allowing the driver to see the trailer-side coupling element on one half of the screen and the tractor vehicle-side coupling means on the other. However, it has proven disadvantageous that the driver must alternately view the screen motifs from the first and second cameras during maneuvering in order to estimate the respective position of the kingpin relative to the fifth wheel coupling.

GB 2513393 A discloses an assistance system for coupling a trailer to a passenger car with several cameras arranged thereon. A composite screen motif can be generated on a display device from the image data from several cameras, with a first camera providing image data of the rear driving area, and second cameras installed in the exterior mirrors laterally extending the rear driving area.

DE 10 2016 120 349 A1 also describes a trailer reversing assistance system with a camera whose image data is used to determine a coupling angle between the tractor vehicle and trailer when the vehicle is automatically steered during the trailer reversing maneuver. The camera can be positioned, in particular, in the upper area of a vehicle tailgate and has a field of view suitable for recording one or more images of the trailer.

SUMMARY OF THE INVENTION

The invention was therefore based on the object of improving a camera system or a tractor vehicle with a camera system installed thereon in such a way that the driver no longer needs to mentally switch between a first and second screen motif when viewing the display device during coupling in order to obtain a comprehensive overview of the areas behind the tractor vehicle that are important to him.

This object is achieved by the first and second camera oriented such that a safety-relevant region (SD) behind the tractor vehicle is recorded by means of the first camera and a coupling-relevant region (SR), in which a coupling element, to be controlled, of the trailer vehicle is discernible, is recorded by means of the second camara. The first and second cameras operate in particular in the visible light range. Alternatively, the cameras can also operate in the non-visible spectrum, and the display device performs visible processing of the first and second image data.

The single screen motif always contains first image data from the first camera and second image data from the second camera. Any contours and visible edges of an object captured in the first and second image data merge seamlessly, i.e., without discontinuities, into the common screen motif. The first image data of the safety-relevant region are preferably supplemented, at least partially, with the second image data of the coupling-relevant region along the vehicle's vertical axis and/or in the rearward extension of the vehicle's longitudinal axis.

This allows the driver to concentrate only on a single screen motif, in which both safety-relevant information regarding a safety-relevant region located behind the tractor vehicle and information relevant to coupling the trailer vehicle regarding a coupling-relevant region in the rearward direction of travel are visible on a single screen motif, while simultaneously avoiding blind spots that cannot be seen.

It may be preferable for the second image data to be displayed on the display device above the first image data.

The screen motif is advantageously composed by stitching first and second image data captured at the same time. Stitching refers to the creation of a large screen motif from various smaller individual images, which generally show overlapping sections of the object. Consequently, a portion of the common screen motif is displayed using the first image data and the second image data.

It is particularly advantageous if the safety-relevant region is defined by a vertical plane at a distance of 0.10 m to 5.00 m, particularly preferably 0.15 m to 3.50 m, very particularly preferably 0.30 m to 3.00 m, and most preferably 0.50 m to 1.00 m behind the tractor vehicle. The vertical plane usually extends down to the road surface or rests on it. If this vertical plane is captured by the first camera, a collision with people or obstacles close to the ground is also detected.

The vertical plane can be detected by the first camera. This results in the advantage that an obstacle located in the vertical plane is included in the first image data and displayed on the display device.

Preferably, a space is detected which is spanned by the vertical plane along the expected trajectory. The tractor vehicle occupies this space when traveling in the reverse direction. The vertical plane then moves back along a trajectory, creating a three-dimensional space. Theoretically, any point within this space can be touched by the tractor vehicle. While the tractor vehicle follows its trajectory, the safety-relevant region does not extend beyond the space in the direction of the vehicle's transverse and vertical axes.

The coupling-relevant region is the area in which the trailer's coupling element is first visible. The second camera is aligned and designed so that a coupling element of the trailer vehicle to be controlled is visible and in focus. The coupling element of the trailer vehicle to be controlled is always visible first in the second image data of the second camera.

The safety-relevant region and the coupling-relevant region are both located behind the vehicle, i.e., they are both at least partially in the rearward extension of the vehicle's longitudinal axis.

The screen motif is expediently formed from the first and second image data, which originate from different positions in the direction of the vehicle's longitudinal axis.

The first and second cameras are advantageously aligned in a rearward direction of travel of the tractor vehicle. This configuration is useful because both the safety-relevant region and the coupling-relevant region for maneuvering before coupling the trailer vehicle are visible in the rearward direction of travel on the display device.

The camera system described above can be mounted on a tractor vehicle, with the second camera being attached to a component of a coupling means of the tractor vehicle. Depending on the mounting position, the second camera can be mounted stationary on the component of the coupling means or movable relative to it, for example, to temporarily remove the second camera from a collision zone with the trailer-side coupling element during coupling. The second camera can also be attached directly to the component of the coupling means or spaced apart from it by means of a bracket.

The tractor vehicle is, for example, a semitrailer tractor, and the coupling means is a fifth wheel coupling with a coupling plate. Advantageously, the component of the fifth wheel coupling is the coupling plate, one of the bearing blocks supporting the coupling plate, a mounting plate supporting the bearing blocks, and/or a support cross member arranged between the bearing blocks and attached to both sides thereof.

The first camera is preferably attached to a rear cross member of the semitrailer tractor. According to a particularly advantageous embodiment of the invention, the semitrailer tractor has a vehicle frame, wherein the vehicle frame is delimited at the rear by the rear cross member and/or the vehicle frame is laterally projected over by the rear cross member. The rear cross member forms the rear end of the semitrailer tractor and is therefore particularly suitable for attaching the first camera in order to capture the road surface immediately behind the semi-trailer tractor without any covers or blind spots.

Alternatively, the tractor vehicle can also be a truck, and the coupling means can be a bar coupling. The component of the bar coupling for attaching the second camera is then expediently its drive-in jaw, a screw-on flange, a housing for the locking mechanism, and/or a coupling body with a drawbar.

The second camera can be attached directly to this respective component or via a bracket. Here, too, it is possible to attach the second camera to the respective component in a fixed position or, alternatively, to mount it movably on it in order to temporarily move the second camera away from a potential collision area as the trailer-side coupling element approaches.

The first camera can, in particular, be attached to an underrun protection bumper of the truck. The underrun protection bumper provides the first camera with an unobstructed view of the safety-relevant region behind the tractor vehicle and, in particular, of any persons or obstacles located behind the truck.

BRIEF DESCRIPTION OF THE DRAWINGS

For a better understanding, the invention is explained in more detail below with reference to three figures showing in FIG. 1: a side view of a semitrailer tractor with a camera system comprising a first and second camera.

DETAILED DESCRIPTION OF THE INVENTION

Figure 1:
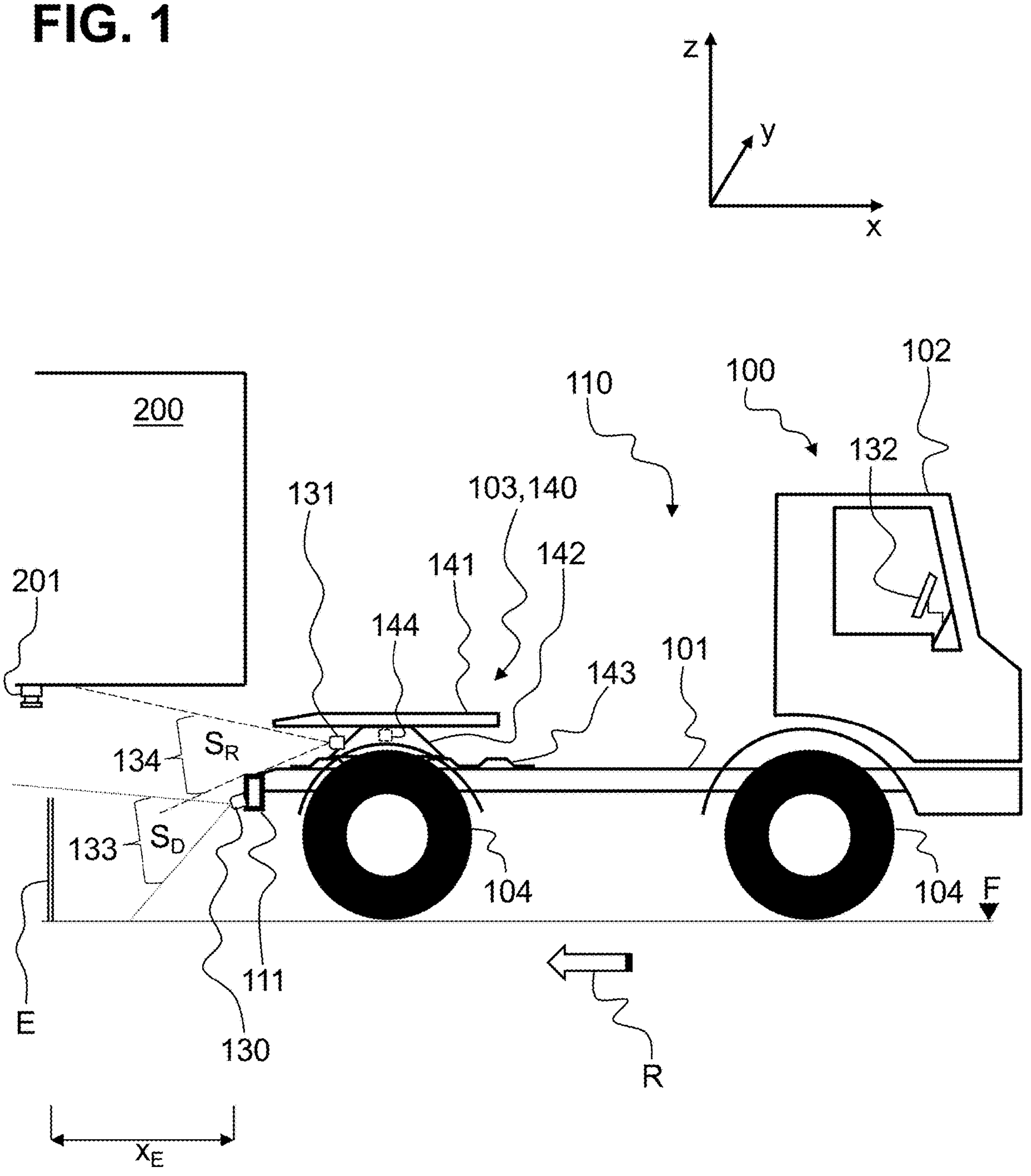

FIG. 1 shows a side view of a tractor vehicle 100 in the form of a semitrailer tractor 110, which is reversing toward a stationary trailer vehicle 200 in order to couple it. The trailer vehicle 200 is a semi-trailer to which a kingpin is attached in the front area as a coupling element 201.

The semitrailer tractor 110 has a vehicle frame 101 extending along a vehicle longitudinal axis x, which supports a driver's cab 102 at one front end and a coupling means 103 configured as a fifth wheel coupling 140 at an opposite, second end. The vehicle frame 101 also supports the wheels 104 with which the tractor vehicle 100 stands on a road surface F.

The fifth wheel coupling 140 comprises a coupling plate 141, into which the coupling element 201 of the trailer vehicle 200 is driven-in during the coupling process and releasably held by a locking mechanism (not shown). The coupling plate 141 is pivotally mounted about a vehicle transverse axis y via two bearing blocks 142, of which only the front bearing block 142 in the image plane is visible in the side view of FIG. 1.

To better absorb lateral moments and forces, a support cross member 144 can be mounted stationary between the two bearing blocks 142 for stiffening purposes. This support cross 144 member is attached to both sides of the bearing blocks 142. In the side view of FIG. 1, the support cross member 144 is concealed by the bearing block 142 projecting in front of it and is therefore only indicated by a dashed line.

The bearing blocks 142 can, in principle, be bolted to the vehicle frame 101 directly or by means of subframes. In the embodiment shown, however, the bearing blocks 142 stand on a mounting plate 143, which in turn is placed on top of the vehicle frame 101 and bolted to it.

The vehicle frame 101 terminates at the rear with a rear cross member 111. The rear cross member 111 projects laterally beyond the vehicle frame 101 in the vehicle transverse axis y and protects the rear of the semitrailer tractor 110 from damage during travel without a trailer vehicle 200. Typically, the rear cross member 111 also projects beyond the wheels 104 in the vehicle transverse axis y.

A first camera 130 is fixedly mounted on the rear cross member 111, which captures and provides first image data 133 from the safety-relevant region SD located directly behind the tractor vehicle 100. The first camera 130 is connected, either wired or wirelessly, to a display device 132 arranged in the driver's cab 102 and located within the driver's field of vision.

The safety-relevant region SD comprises a vertical plane E extending from the road surface F, which must be captured by the first camera 130. The vertical plane E can have a maximum size corresponding to the cross-sectional profile A of the tractor vehicle 100. The vertical plane E is spaced from the tractor vehicle 100 by a distance XE in the rearward extension of the vehicle's longitudinal axis x.

On a component of the fifth wheel coupling 140, for example as shown in FIG. 1, a second camera 131 is mounted on one of the bearing blocks 142 and/or on the coupling plate 141 and/or on the mounting plate 143 and/or on the support cross member 144, which second camera 131 captures and provides second image data 134 from a coupling-relevant region SR.

The coupling-relevant region SR is arranged in the vehicle's vertical axis z above the safety-relevant region SD and extends beyond the safety-relevant region SD in the rearward extension of the vehicle's longitudinal axis x, so that the expected coupling element 201 of the trailer vehicle 200 is the first to be seen there for coupling purposes in the rearward direction of travel R.

Behind the tractor vehicle 100, the coupling-relevant region SR and the safety-relevant region SD overlap with increasing distance along the vehicle's longitudinal axis x.

In the safety-relevant region SD captured by the first camera 130, the road surface F located directly behind the tractor vehicle 100 is captured, whereas the coupling element 201 of the trailer vehicle 200 is only visible from a great distance but cannot be recognized due to the focus of the first camera. Consequently, the primary purpose of the first camera 130 is to use its first image data 133 to make a person P (see FIG. 3) lying directly behind the tractor vehicle 100 or a low obstacle visible to the driver on the display device 132.

The second camera 131, which is arranged offset from the first camera 130 along the vehicle's longitudinal axis x and a vehicle's vertical axis z, cannot capture the area of the road surface F located directly behind the tractor vehicle 100 with its second image data 134, since this region is obscured by parts of the tractor vehicle 100, such as the fifth wheel coupling 140, the vehicle frame 101 with attachments not shown, or the rear cross member 111. Therefore, a person P lying directly behind the tractor vehicle 100 or a low obstacle would not be visible to the driver based solely on the second image data 134 on the display device 132.

The display device 132 presents the driver with a coherent screen motif 135 comprising first image data 133 from the first camera 130 and second image data 134 from the second camera 131, as will be explained below in connection with FIG. 3, without the driver having to mentally switch between two or more individual screen motifs during the coupling maneuver.

Figure 2:
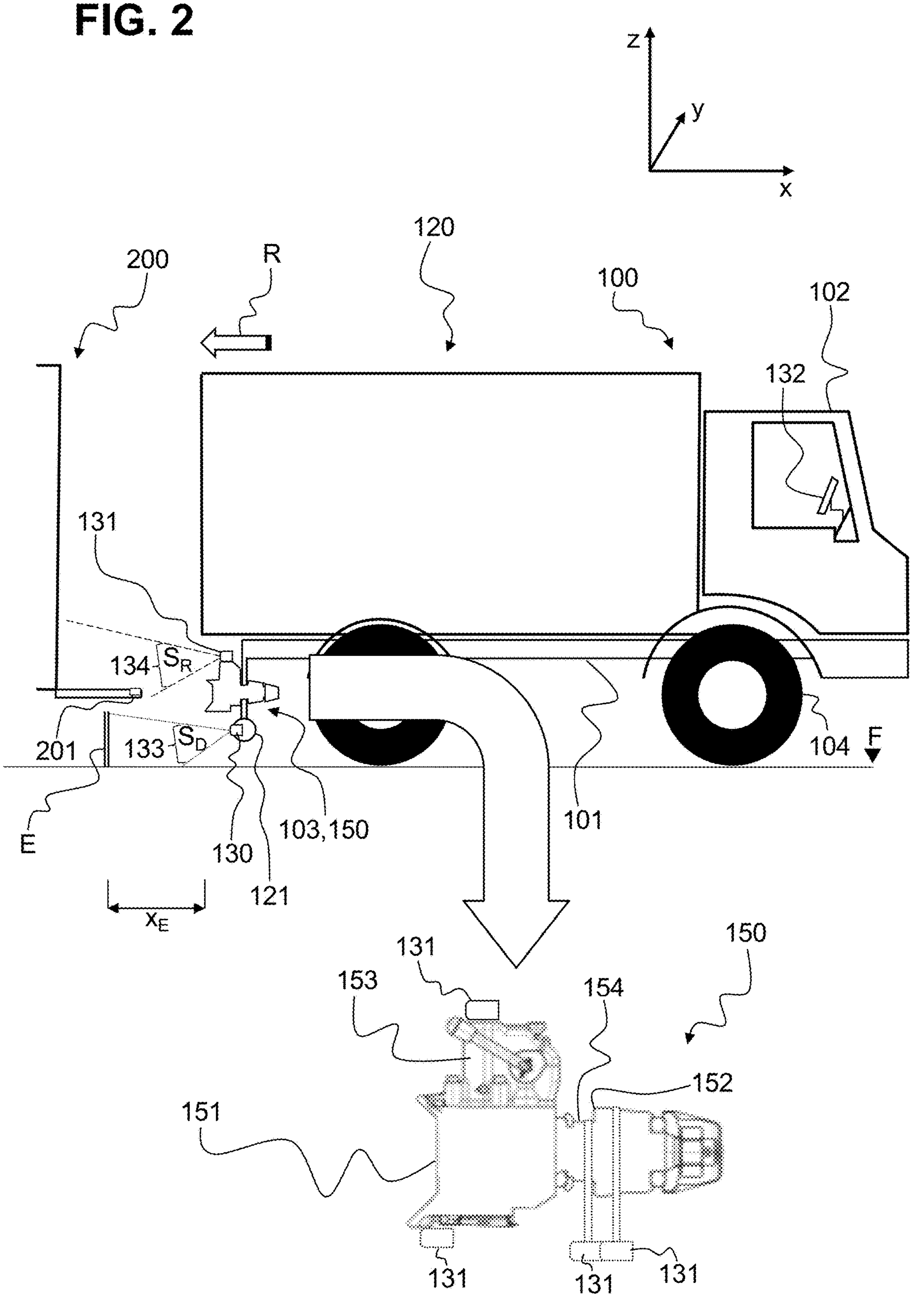
FIG. 2: a side view of a truck with a camera system comprising a first and second camera.

FIG. 2 shows an alternative embodiment of the invention, in which the camera system is installed on a tractor vehicle 100 in the form of a truck 120.

A bar coupling 150, shown enlarged for clarity, is located at the rear of the truck 120 as the coupling means 103.

The trailer vehicle 200 has a drawbar as the coupling element 201, with a towing eye formed at its free end. To connect the truck 120 to the trailer vehicle 200, the towing eye is driven-in into the bar coupling 150 and locked therein by means of a coupling bolt (not shown).

Offset in the vehicle's vertical axis z, an underrun protection bumper 121 is located below the bar coupling 150. This underrun protection bumper 121 extends laterally beyond the vehicle frame 101 in the vehicle's transverse axis y and prevents the trailer-side coupling element 201, parts of the trailer vehicle 200, or other obstacles from sliding under the tractor vehicle 100 and causing damage when reversing without the trailer vehicle 200. In this exemplary embodiment, the first camera 130 is mounted on the underrun protection bumper 121.

The first camera 130 captures the first image data 133 of the safety-relevant region SD located in the vehicle's longitudinal axis x directly behind the underrun protection bumper 121. The first image data 133 includes, among other things, the road surface F located behind the tractor vehicle 100. The first camera 130 is not suitable for capturing the coupling element 201 of the trailer vehicle 200 due to its low mounting position on the truck 120 and its focus, as the coupling element 201 is located significantly above the first camera 130 along the vehicle's vertical axis x. The safety-relevant region SD is defined by the distance XE of the vertical plane E from the tractor vehicle 100.

The second camera 131 attached to components of the bar coupling 100 is used for navigation during coupling. In particular, and as shown in FIG. 2, it is mounted on a housing 153 of the locking mechanism and/or indicated by a dashed line, on an drive-in jaw 151 and/or preferably by means of a camera holder on a coupling body with a drawbar 154 and/or likewise preferably by means of a camera holder on a screw-on flange 152. In this installation position, the second camera 131 is located in the vehicle's vertical axis z at a level opposite the trailer-side coupling element 201 to be accommodated in the form of a towing eye. The second image data 134 recorded by the second camera 131 primarily depicts the trailer-side coupling element 201 within the coupling-relevant region SR as the truck 120 approaches the trailer vehicle 200, but does not capture the rear safety-relevant region SD located directly behind the underrun protection bumper 121 and the road surface F located there.

Figure 3:
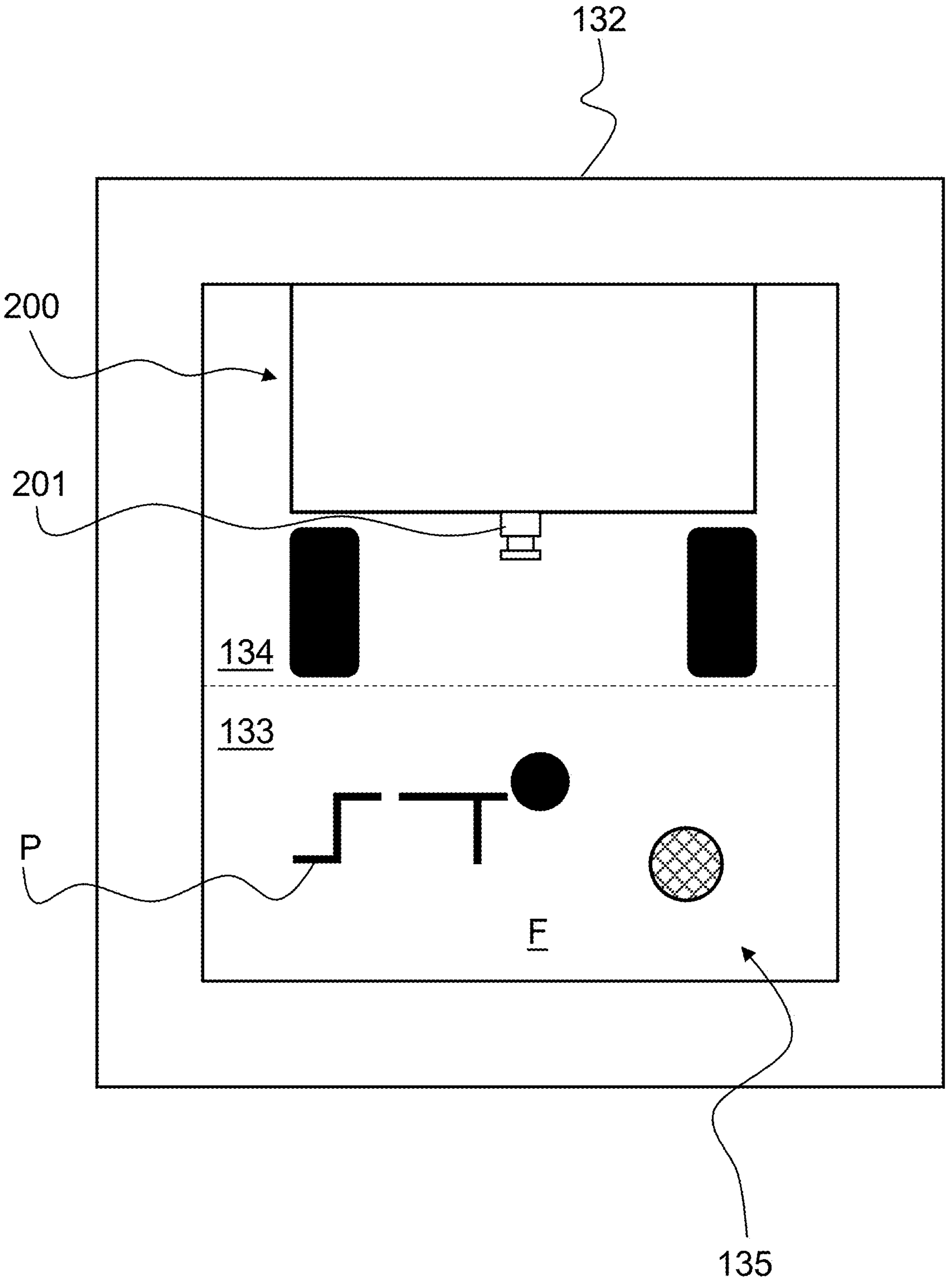
FIG. 3: a display device with a screen motif composed of first and second image data.

On the display device 132 shown as an example in FIG. 3, the first and second image data 133, 134 are linked to one another and displayed on the display device 132 as a common screen motif 135.

The first image data 133 is displayed in a partial section of the display device 132, and the safety-relevant region SD directly behind the tractor vehicle 100 can be seen. Any person P crawling behind the tractor vehicle 100, for example, a child crawling in search of a ball, is captured by the first image data 133 and is not located in the blind spot of the higher-mounted second camera 131. The second camera 131 provides second image data 134 in a further partial section of the display device 132, which second image data 134 are optimized for displaying the trailer vehicle 200 and its coupling element 201, for example, in the form of a kingpin. However, the partial section with the first image data 133 and the partial section with the second image data 134 do not need to occupy the same size on the display device 132.

The first and second image data 133, 134 merge seamlessly into one another, so that the driver only needs to concentrate on the single screen motif 135. The first image data 133 are preferably arranged at the bottom of the display device 132, and the second image data 134 is arranged at the top.

LIST OF REFERENCE NUMERALS

100 Tractor vehicle
101 Vehicle frame
102 Driver's cab
103 Coupling means
104 Wheels
110 Semitrailer tractor
111 Rear cross member
120 Truck
121 Underrun protection bumper
130 First camera
131 Second camera
132 Display device
133 First image data
134 Second image data
135 Screen motif

140 Fifth wheel coupling
141 Coupling plate
142 Bearing blocks
143 Mounting plate
144 Support cross member
150 bar coupling
151 drive-in jaw
152 Screw-on flange
153 Housing locking mechanism
154 Coupling body with drawbar
200 Trailer vehicle
201 Coupling element
A Cross-sectional profile of tractor vehicle
E Vertical plane of safety-relevant region
F Road surface
P Person
R Rearward direction of travel
SD Safety-relevant region
SR Coupling-relevant region
x Longitudinal axis of vehicle
XE Distance between plane and safety-relevant region
y Transverse axis of vehicle
Z Vertical axis of vehicle

What is claimed is:

1. A tractor vehicle with a camera system for the accurate coupling of a trailer vehicle, having a first camera that is attached to the tractor vehicle and provides first image data, and a second camera that provides second image data and is attached in an offset manner on one of the vehicle axes (x, y, z) of the tractor vehicle with respect to the first camera, wherein the first and second image data are displayed as a common screen motif on a display device installed in the driver's cab, and the first and second camera are oriented such that a safety-relevant region (SD) behind the tractor vehicle is recorded by means of the first camera and a coupling-relevant region (SR), in which a coupling element, to be controlled, of the trailer vehicle is discernible, is recorded by means of the second camera, wherein the safety-relevant region (SD) is captured by the first camera and comprises a vertical plane (E) which stands on the road surface (F) spaced from the towing vehicle by a distance (XE) of 0.10 m to 1.00 m in the rearward extension of the vehicle's longitudinal axis (x), wherein the second camera is attached to a component of a coupling means of the tractor vehicle, wherein the tractor vehicle is a semitrailer tractor and the coupling means is a fifth wheel coupling with a coupling plate, and wherein the component of the fifth wheel coupling is the coupling plate, a bearing block supporting the coupling plate, a mounting plate supporting a plurality of bearing blocks, and/or a support cross member arranged between the bearing blocks and attached to both sides thereof.

2. The tractor vehicle according to claim 1, wherein the vertical plane (E) is detected by the first camera.

3. The tractor vehicle according to claim 1, wherein a space is detected which is spanned by the plane (E) along the expected trajectory.

4. The tractor vehicle according to claim 1, wherein the screen motif is formed from the first and second image data originating from different positions in the direction of the vehicle's longitudinal axis (x).

5. The tractor vehicle according to claim 1, wherein the first image data always capture a section of a road surface (F) located directly behind the tractor vehicle.

6. The tractor vehicle according to claim 1, wherein the first and second cameras are aligned in the rearward direction of travel (R) of the tractor vehicle.

7. The tractor vehicle according to claim 1, wherein the first camera is attached to a rear cross member of the semitrailer tractor.

8. The tractor vehicle according to claim 7, wherein the semitrailer tractor has a vehicle frame, wherein the vehicle frame is delimited at the rear by the rear cross member and/or the vehicle frame is laterally projected over by the rear cross member.

9. The tractor vehicle according to claim 1, wherein the tractor vehicle is a truck and the coupling means is a bar coupling.

10. The tractor vehicle according to claim 9, wherein the first camera is attached to an underrun protection bumper of the truck.

11. A tractor vehicle with a camera system for the accurate coupling of a trailer vehicle, having a first camera that is attached to the tractor vehicle and provides first image data, and a second camera that provides second image data and is attached in an offset manner on one of the vehicle axes (x, y, z) of the tractor vehicle with respect to the first camera, wherein the first and second image data are displayed as a common screen motif on a display device installed in the driver's cab, and the first and second camera are oriented such that a safety-relevant region (SD) behind the tractor vehicle is recorded by means of the first camera and a coupling-relevant region (SR), in which a coupling element, to be controlled, of the trailer vehicle is discernible, is recorded by means of the second camera, wherein the safety-relevant region (SD) is captured by the first camera and comprises a vertical plane (E) which stands on the road surface (F) spaced from the towing vehicle by a distance (XE) of 0.10 m to 1.00 m in the rearward extension of the vehicle's longitudinal axis (x), wherein the second camera is attached to a component of a coupling means of the tractor vehicle, wherein the tractor vehicle is a truck and the coupling means is a bar coupling, and wherein the component of the bar coupling is a drive-in jaw, a screw-on flange, a housing of the locking mechanism, and/or a coupling body with a drawbar.

12. The tractor vehicle according to claim 11, wherein the first camera is attached to an underrun protection bumper of the truck.

13. A tractor vehicle with a camera system for the accurate coupling of a trailer vehicle, having a first camera that is attached to the tractor vehicle and provides first image data, and a second camera that provides second image data and is attached in an offset manner on one of the vehicle axes (x, y, z) of the tractor vehicle with respect to the first camera, wherein the first and second image data are displayed as a common screen motif on a display device installed in the driver's cab, and the first and second camera are oriented such that a safety-relevant region (SD) behind the tractor vehicle is recorded by means of the first camera and a coupling-relevant region (SR), in which a coupling element, to be controlled, of the trailer vehicle is discernible, is recorded by means of the second camera, wherein the safety-relevant region (SD) is captured by the first camera and comprises a vertical plane (E) which stands on the road surface (F) spaced from the towing vehicle by a distance (XE) of 0.10 m to 1.00 m in the rearward extension of the vehicle's longitudinal axis (x), wherein the vertical plane (E) is detected by the first camera, and wherein a space is detected which is spanned by the plane (E) along the expected trajectory, wherein the screen motif is formed from the first and second image data originating from different positions in the direction of the vehicle's longitudinal axis (x), and wherein the first image data always capture a section of a road surface (F) located directly behind the tractor vehicle.

14. The tractor vehicle according to claim 13, wherein the first and second cameras are aligned in the rearward direction of travel (R) of the tractor vehicle, wherein the second camera is attached to a component of a coupling means of the tractor vehicle, and wherein the tractor vehicle is a semitrailer tractor and the coupling means is a fifth wheel coupling with a coupling plate.

15. The tractor vehicle according to claim 14, wherein the component of the fifth wheel coupling is the coupling plate, a bearing block supporting the coupling plate, a mounting plate supporting a plurality of bearing blocks, and/or a support cross member arranged between the bearing blocks and attached to both sides thereof, wherein the first camera is attached to a rear cross member of the semitrailer tractor, and wherein the semitrailer tractor has a vehicle frame, wherein the vehicle frame is delimited at the rear by the rear cross member and/or the vehicle frame is laterally projected over by the rear cross member.

* * * * *